US006993678B2

(12) United States Patent
Cheok et al.

(10) Patent No.: US 6,993,678 B2
(45) Date of Patent: Jan. 31, 2006

(54) LOGICAL ZONE TABLE GENERATION PROCESS AND APPARATUS

(75) Inventors: Steven Tian Chye Cheok, Singapore (SG); YongPeng Chng, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 644 days.

(21) Appl. No.: 09/977,100

(22) Filed: Oct. 12, 2001

(65) Prior Publication Data

US 2002/0091964 A1 Jul. 11, 2002

Related U.S. Application Data

(60) Provisional application No. 60/239,981, filed on Oct. 13, 2000.

(51) Int. Cl.
*G06F 11/00* (2006.01)

(52) U.S. Cl. .................................. 714/8; 369/53.17

(58) Field of Classification Search ................ 714/8, 714/7, 6; 360/53; 711/202, 209; 369/13.11, 369/47.14, 53.17, 53.16
See application file for complete search history.

(56) References Cited

U.S. PATENT DOCUMENTS

| 5,111,444 | A  | * | 5/1992  | Fukushima et al. | ...... 369/53.17 |
| 5,235,585 | A  | * | 8/1993  | Bish et al.      | ......... 369/53.17 |
| 5,271,018 | A  | * | 12/1993 | Chan             | ............. 714/710 |
| 6,185,058 | B1 | * | 2/2001  | Dobbek et al.    | .......... 360/48 |
| 6,223,303 | B1 | * | 4/2001  | Billings et al.  | ............. 714/8 |
| 6,469,978 | B1 | * | 10/2002 | Ohata et al.     | ........ 369/275.3 |
| 6,493,301 | B1 | * | 12/2002 | Park             | ....................... 369/53.15 |
| 6,510,114 | B1 | * | 1/2003  | Yeo et al.       | .................. 369/53.2 |
| 6,560,055 | B1 | * | 5/2003  | Nemazie et al.   | ............. 360/53 |
| 6,563,776 | B1 | * | 5/2003  | Oi et al.        | ............... 369/53.15 |
| 6,594,208 | B1 | * | 7/2003  | Ko et al.        | ............. 369/47.14 |
| 6,631,106 | B1 | * | 10/2003 | Numata et al.    | ......... 369/53.17 |
| 6,654,904 | B1 | * | 11/2003 | Andoh et al.     | ................. 714/8 |
| 6,658,593 | B1 | * | 12/2003 | Ko               | ................. 714/8 |
| 6,728,899 | B1 | * | 4/2004  | Ng et al.        | ................. 714/8 |
| 6,757,119 | B2 | * | 6/2004  | Leow et al.      | .............. 360/31 |
| 2003/0103427 | A1 | * | 6/2003 | Yeo et al.      | ............. 369/47.14 |
| 2004/0073832 | A1 | * | 4/2004 | Ko              | ................. 714/8 |
| 2004/0078648 | A1 | * | 4/2004 | Sims et al.     | ................. 714/8 |
| 2004/0081067 | A1 | * | 4/2004 | Ko              | ........... 369/275.3 |
| 2004/0160868 | A1 | * | 8/2004 | Sasaki et al.   | ........... 369/47.14 |

* cited by examiner

*Primary Examiner*—Robert Beausoliel
*Assistant Examiner*—Christopher McCarthy
(74) *Attorney, Agent, or Firm*—Kirk A. Cesari

(57) ABSTRACT

A disc-drive system and method for generating logical zones that each have an approximate number of spare sectors, and that are used to translate logical block addresses. A disc drive includes a disc-drive housing and a disc assembly mounted to rotate within the housing. A transducer is positionable to transduce data to and from first, second and third zones. An address translator translates a logical block address to a position address. A controller is operable to control positioning of the transducer based on the position address, wherein a first predetermined number of spare sectors are allocated to the first zone, and a second predetermined number of spare sectors are allocated to the second zone and third zone combined. Some embodiments further include a logical zone table, wherein each logical zone includes one or more zones based on a number of defects found in each zone, in order that each logical zone includes a similar number of defects.

17 Claims, 4 Drawing Sheets

Fig. 4
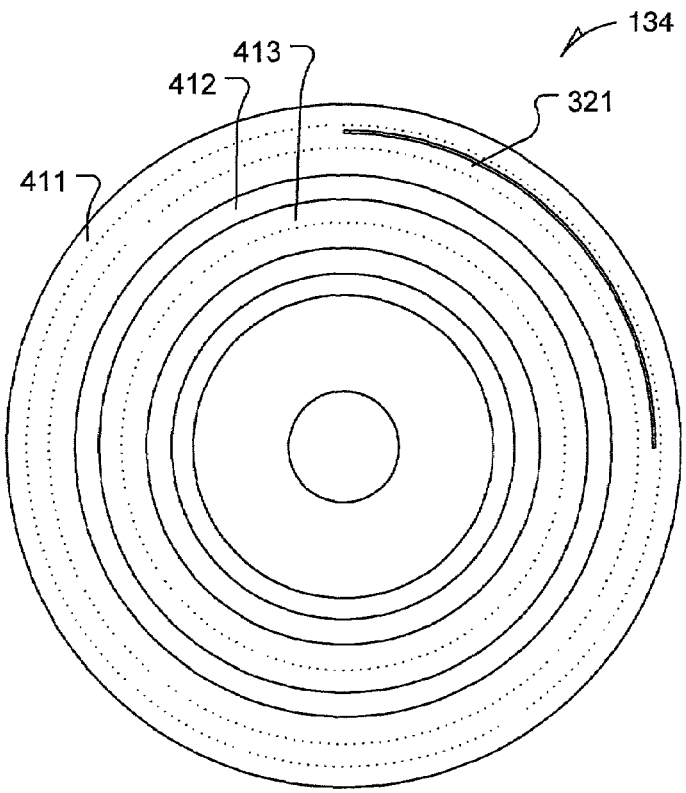
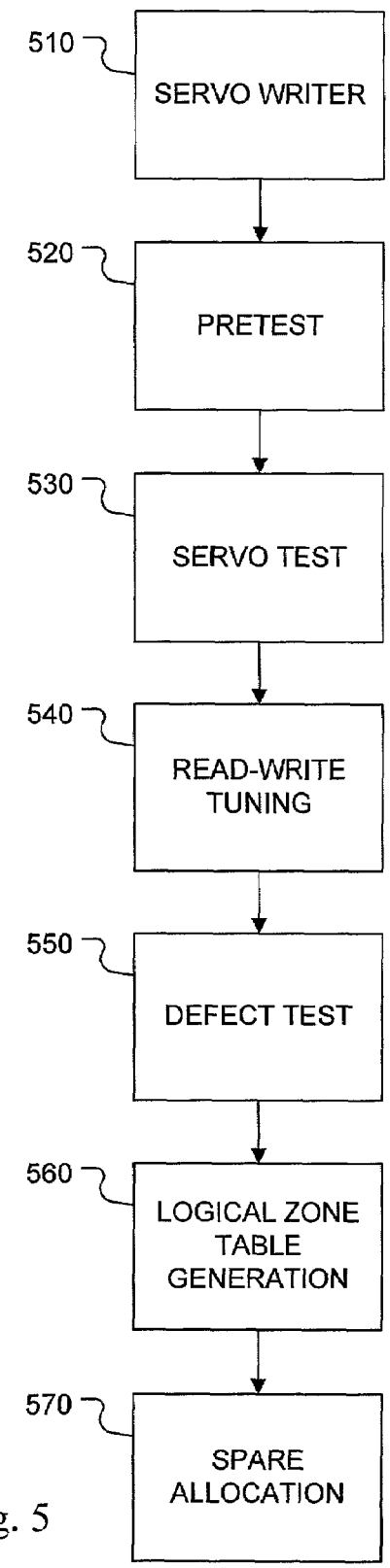
Fig. 5

LOGICAL ZONE TABLE GENERATION PROCESS AND APPARATUS

RELATED APPLICATIONS

This application claims the benefit under 35 U.S.C. 119(e) of U.S. Provisional Application Ser. No. 60/239,981 filed Oct. 13, 2000.

FIELD OF THE INVENTION

The present invention relates to the field of mass-storage devices. More particularly, this invention relates to a method and apparatus for generating logical zones that each have an approximate number of spare sectors, and that are used to translate logical block addresses.

BACKGROUND OF THE INVENTION

Disc-drive devices that store massive amounts of data are key components of computer systems. A disc drive typically includes a disc assembly having at least one disc that is rotated, an actuator that moves a transducer to various locations over the rotating disc, and circuitry that is used to write and/or read data to and from the disc via the transducer. The disc drive also includes circuitry for encoding data to be written to the disc so that it can be successfully retrieved from the disc and decoded. A microprocessor is typically used to control most operations within the disc drive, and to transmit read data to an external computer (or information processing system) and receive data from the external computer to write to the disc.

The disc drive includes a transducer for writing data onto circular or spiral tracks in a magnetic layer on the disc surfaces and for reading the data from the magnetic layer. In some drives, the transducer includes an electrically driven coil (or "write head") that provides a magnetic field for writing data, and a magneto-resistive (MR) element (or "read head") that detects changes in the magnetic field along the tracks for reading data. Each disc surface is typically allocated into a number of concentric circular tracks and data is stored along these tracks as individual magnetized patterns along the track. The transducer having a flux path and a gap is used to magnetize the track. The gap is passed near the disc. By changing the magnetic flux passing across the gap, individual portions of the track are magnetized. The same transducer is also used to read the data from the disc. Some transducers include a electromagnetic coil write head and a magneto-resistive read head.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Encoded information representative of data is stored on the tracks on the surface of the disc. A transducer, (read/write heads attached to a slider), is typically located on each side of each storage disc, and reads or writes information on the disc surface when the transducer is accurately positioned over one of the designated tracks on the surface of the storage disc. The transducer is moved to and held over a target track based on servo information read from the disc surface. As the storage disc spins and the read/write head is accurately positioned above a target track, the write head serially stores data onto a track by magnetically writing encoded information representative of data onto the storage disc. Similarly, reading data on a storage disc is accomplished by positioning the read head above a target track and reading the stored material on the storage disc. To write on or read from different tracks, the read/write head is moved radially across the tracks to a selected target track.

During manufacture, servo information is encoded on the disc to define tracks, and is subsequently used to accurately locate the transducer on these tracks to write and read data. Some drives use a dedicated servo surface to define tracks for all the other disc surfaces, while modem disc drives typically use embedded servo signals, where every disc surface includes its own servo information interspersed with data information. The written servo information is used during normal write and read operations to locate the actuator and its arm assembly and transducer head(s) at the required position on the disc surface and hold them very accurately in position during a read or write operation. The servo information is written or encoded onto the disc with a machine commonly referred to as a servo-track writer (STW) that is removed from the disc drive after the servo writing is completed. At the time the servo information is written, the disc drive is typically at the "head disk assembly" (HDA) stage. The HDA includes most of the mechanical drive components but does not typically include all the drive electronics. During the track writing process, the STW precisely locates the transducer heads relative to the disc surface and writes the servo information thereon. Accurate location of the transducer heads is necessary to ensure that the track definition remains concentric. If the servo track information is written eccentrically, the position of the transducer head during subsequent operation will require relatively large, constant radial adjustments in order to maintain placement over the track center. When the tracks are sufficiently eccentric, a significant portion of the disk surface must be allotted for track misregistration.

When the disc drive is manufactured, it is typical to write servo tracks on the disc surface in a predetermined pattern as described above. The encoded pattern of these servo tracks are later read and used to move the read/write heads to, and maintain the read/write heads on, a desired track of data. Typically, there will be a slight radial movement required to move either the read head or the write head to the centerline of the desired track. That is, once the position of the track is determined by reading the servo information, the read head (which was used to read the servo information) can be positioned to the centerline of the track, however a separate adjustment of the radial position may be required if the write head is to be positioned to the centerline of the track. The spacing between the read and write heads can vary from head to head because of manufacturing variations and differences in the angle which different heads are attached to their respective arms. Further, a rotary actuator moves the read and write heads in an arc, rather than along a radius of the disc, and thus the spacing between the read and write heads will vary depending on the radius of the track being accessed.

One design goal is to increase the storage capacity of disc drives. One way to increase capacity is to increase the density of tracks on the disc, and the density of date within each track, in order to save space and reduce the number of discs needed to store a particular amount of data. Several methods are currently used to store data on a disc. One method divides the disc surfaces into frequency zones, and groups one or more contiguous tracks into each frequency zone. Within each frequency zone, the transducer writes the data onto the disc at a fixed frequency as the magnetic disc rotates at a fixed angular velocity. The performance (in terms of the maximum frequency that data can be written and read reliably) of each frequency zone is determined, in order to determine the frequency that will be used for that frequency zone. Typically, a plurality of frequencies are tested, and the highest frequency giving reliable data transfer to all tracks within the frequency zone is used as the frequency for the entire frequency zone.

During manufacture of a disc drive, one or more sectors are typically discovered that have errors (initial defective sectors). One spare sector is typically allocated to replace each bad sectors discovered during manufacture. The initial defective sectors are marked as permanently unreadable, and are thereafter never used.

Disc drives are made more useful by defining the sectors on the drive using logical block addresses (LBAs). The logical block addresses are sequential sector numbers starting at zero or one and going up to a maximum LBA determined by the nominal capacity of the drive. An LBA provided to the drive is then translated to a selected disc position, for example, to the cylinder, head, and sector within the selected track that the sector will be found.

The process of reallocating spare sectors are to replace defective sectors complicates the process of translating LBAs to physical locations. There is, therefore, a need for a method and apparatus to allocate spare sectors and to translate addresses that improve the reliability, available storage space, and performance of a disc drive.

SUMMARY OF THE INVENTION

The invention provides a disc-drive system that includes a disc drive. The disc drive includes a disc-drive housing and a disc assembly mounted to rotate within the housing. The disc assembly includes at least a first disc surface having a plurality of zones including a predefined first zone having a plurality of sectors of data and a predefined second zone having a plurality of sectors of data and a predefined third zone having a plurality of sectors of data. The disc drive also includes a first transducer positionable facing the first disc surface to transduce data to and from the first zone and the second zone and the third zone, an address translator that translates a logical block address to a position address and a controller operable to control positioning of the transducer based on the position address, wherein a first predetermined number of spare sectors are allocated to the first zone, and a second predetermined number of spare sectors are allocated to the second zone and third zone combined.

In some embodiments of the system, all of the plurality of sectors of data in the first zone are recorded at a predetermined first frequency, all of the plurality of sectors of data in the second zone are recorded at a predetermined second frequency that is different than the first frequency, and all of the plurality of sectors of data in the third zone are recorded at a predetermined third frequency that is different than the first frequency and different than the second frequency.

In some embodiments of the system, the address translator further comprises a logical zone table, and wherein each logical zone includes one or more zones based on a number of defects found in each zone in order that each logical zone includes a similar number of defects. In some such embodiments, each logical zone is allocated a number of spare sectors based on the number of defects found in all zones of the logical zone. In some embodiments, each logical zone only includes contiguous zones.

In some embodiments, the address translator further comprises a logical zone table formed by iteratively combining a plurality of contiguous zones into logical zones in order to create logical zones each including a similar number of defects.

Some embodiments of the system further include an information-handling system operatively coupled to transmit data to and from the disc drive, an input/output subsystem operatively coupled to input and output data to the information-handling system, and a memory operatively coupled to transmit data to and from the information-handling system.

The invention also provides a method for determining locations of sectors in a disc drive, comprising steps of (a) allocating a plurality of zones for data, (b) determining a defect rate in each of the plurality of zones, and (c) allocating spare sectors based on the determined defect rates.

Some embodiments of the method further include a step of (d) forming logical zones based on the determined defect rates, each logical zone having one or more of the plurality of zones, in order that each logical zone has a similar total number of defects.

In some embodiments of the method, the step (c) of allocating further comprises allocating a number of spare sectors for each logical zone based on the total number of defects in that logical zone.

Some embodiments of the method further include steps of (e) forming a logical zone table, the logical zone table having one or more zones in each logical zone, and (f) translating a logical block address (LBA) into a physical address using the logical zone table.

BRIEF DESCRIPTION OF THE DRAWINGS

FIG. 4 is a diagram of a disc surface 1341 divided into logical zones.

FIG. 5 is a flowchart of a disc-drive certification process 500 used in some embodiments.

DESCRIPTION OF THE PREFERRED EMBODIMENT

Figure 1:
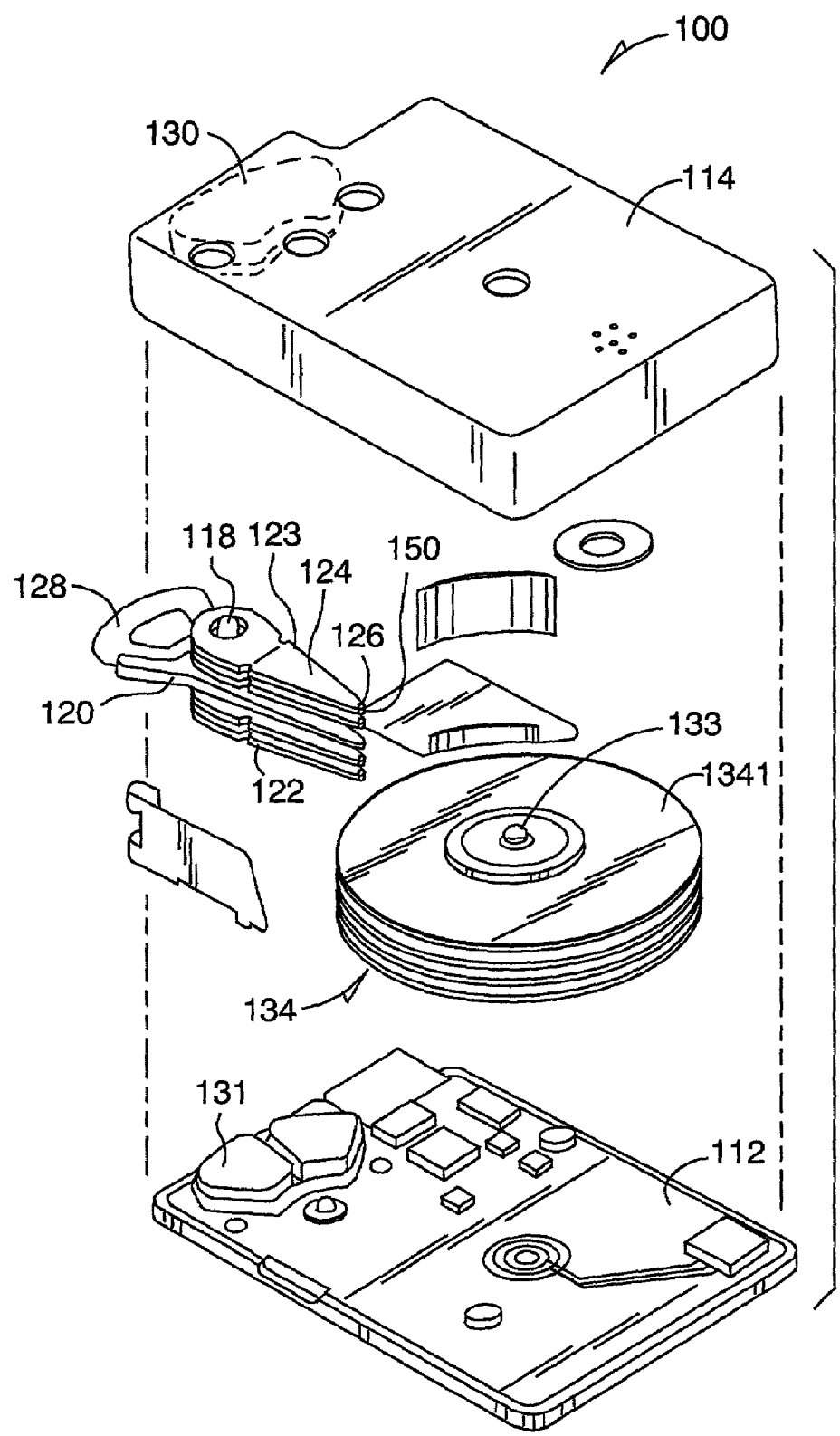
FIG. 1 is an exploded view of a disc drive 100 with a multiple disc stack.

In the following detailed description of the preferred embodiments, reference is made to the accompanying drawings which form a part hereof, and in which are shown, by way of illustration, specific embodiments in which the invention may be practiced. It is to be understood that other embodiments may be utilized and structural changes may be made without departing from the scope of the present invention.

The invention described in this application is useful for all types of disc drives, including magnetic hard-disc drives, optical disc drives, CDROM, writable CDROM, and rewritable CDROM disc drives, ZIP drives, floppy-disc drives, and any other type of drives, systems of drives (such as a "redundant array of inexpensive/independent disc drives," or RAID, configuration) or other devices, where a storage disc assembly is rotated within a housing, and spare sectors are allocated. The invention is useful with many electrical and mechanical configurations of disc drives having either rotary or linear actuation, and embedded or dedicated servo configurations.

In some embodiments, each sector stored includes an indication stored in the sector of its own address, i.e., the disc address that the sector's data belongs at. This allows the drive to skip the bad sectors that were marked permanently unreadable. Thus, beginning at some starting point, the disc drive will read all sectors and search until a sector is found that includes the address of the desired sector, discarding the other sectors and thus skipping the sectors that were marked permanently unreadable. Typically, a plurality of such starting points are defined, for example, each successive track can define a new starting point. If the drive is reading sectors that have an address higher than the address sought, sectors earlier on that track are read on a subsequent revolution of the disc, or the previous track can be read.

The translation of an LBA to a physical position location is sped up by keeping a table of such starting points, along with the LBA range for the disc area covered by each starting point.

Additional spare sectors are also typically allocated across the surface of each disc. During the lifetime of a disc drive, sectors that were initially good or error free will begin to show errors, some of which (soft errors) can be corrected using redundant information encoded on the disc, and others of which (hard errors) cannot be corrected. When a sector gets a hard error (or one or more soft errors), this is called a "grown defective sector." To correct for this, the disc drive can find a subsequent spare sector, then copy every sector from the grown defective sector to the sector just preceding the spare sector to its respective following sector (the sector with a number one higher), in a process called "slipping." That is, the sector just before the spare sector is copied (moved or slipped) to the spare sector space, the sector two before the spare sector is copied (moved) to the sector space just before the spare sector, and so on. The grown defective sector is then marked as permanently unreadable, and is thereafter ignored. Each slipped sector will keep its own address, i.e., the address that shows which data is stored in that space.

FIG. 1 is an exploded view of one embodiment of the present invention, this embodiment showing one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. In some embodiments, transducer 150 includes a electromagnetic coil write head 97 and a magneto-resistive read head 98. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one MR transducer 150 is generally used for reading and another transducer such as a coil is generally used for writing. On the end of the actuator arm assembly 120 opposite the load springs 124 and the sliders 126 is a voice coil 128.

Attached within the base 112 is a first magnet 131 and a second magnet 130. As shown in FIG. 1, the second magnet 130 is associated with the cover 114. The first and second magnets 130 and 131, and the voice coil 128 are the key components of a voice-coil motor which applies a force to the actuator assembly 120 to rotate it about the actuator shaft 118. Also mounted to the base 112 is a spindle motor 132. The spindle motor 123 includes a rotating portion called spindle hub 133. In this particular disc drive, the spindle motor 132 is within hub 133. In FIG. 1, a number of discs 134 (one or more; four are shown) are attached to the spindle hub 133 to form disc assembly 132. One disc recording surface 1341 is shown, however each top and bottom surface of each disc 134 will typically have a recording surface. In other disc drives, a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 2:
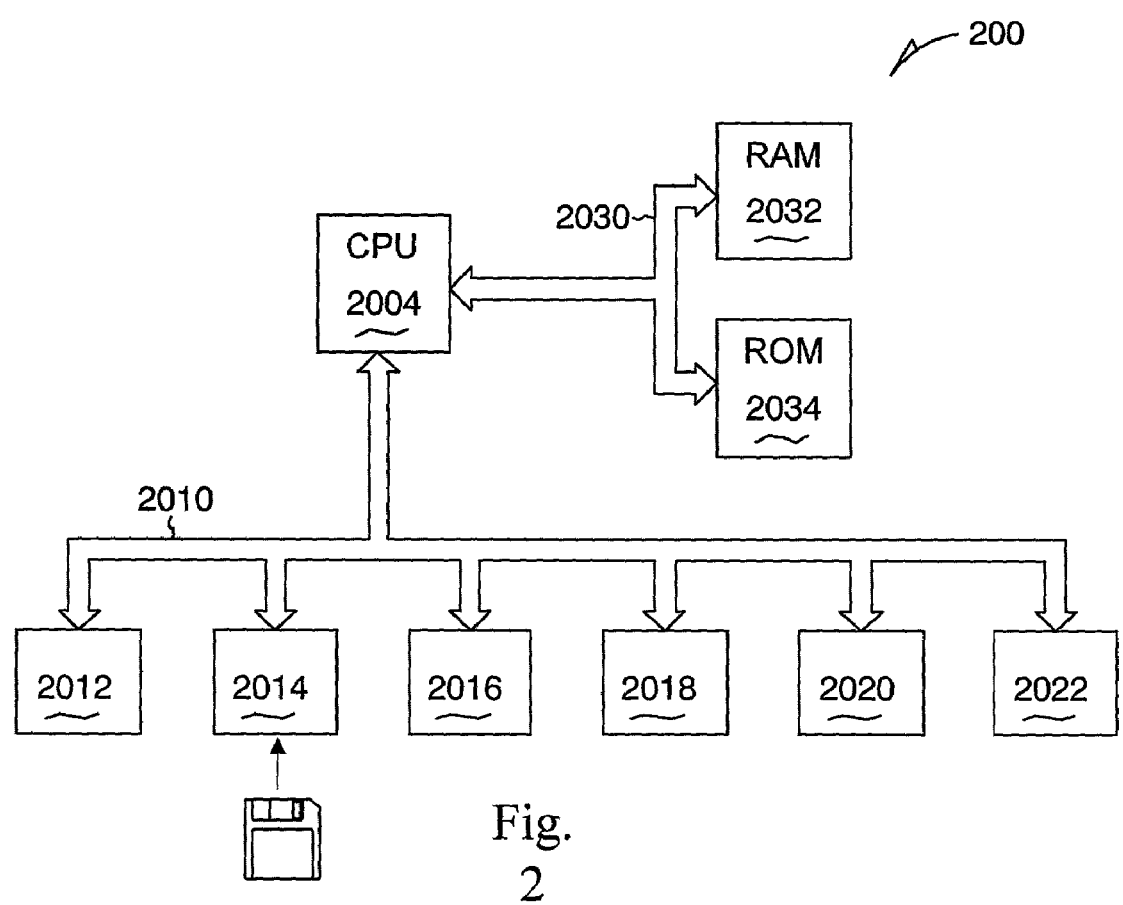
FIG. 2 is a block diagram of an information handling system 200 used in some embodiments of the present invention.

Some embodiments of disc-drive system 100 further include data-handling system 200, shown in FIG. 2, operatively coupled to at least read data from the disc 134. The data-handling system 200 further includes one or more data processors 2004, one or more memories such as random access memory 2032 and read-only memory 2034 operatively coupled to each one of the one or more data processors 2004, and at least one input/output system 2012–2022 coupled via bus 2010 to at least one of the one or more data processors 2004 to receive input data and to supply output data. In FIG. 2, block 2012 is a disc-drive subsystem that includes one or more disc drives 100 as described above. In some embodiments, block 2014 is a removable-media subsystem including a diskette drive that reads data from diskette 2001 (or other computer readable media). In some embodiments, input/output system 2012–2022 includes block 2012 that is a graphical user output subsystem, having, for example, a CRT or LCD output display and a display adaptor card, block 2014 that is a user input subsystem, having, for example, a keyboard and/or mouse input device(s), block 2016 that is a network subsystem, having, for example, a network interface card (NIC) and a connected network having such devices as a file server, print server, etc., block 2018 that is an internet interface subsystem, having, for example, a modem connected to a telephone line, DSL router, or cable, block 2020 that is a printer subsystem, and block 2022 that is an external device controller subsystem, having, for example, an X10(TM) controller (such as those sold by www.x10.com) for controlling, and/or receiving information from, external devices such as lamps, video cameras, alarms, motors, video recorders, etc. Some embodiments of system 200 will have all the described I/O devices, and other embodiments will contain a subset of these devices, or none.

Figure 3:
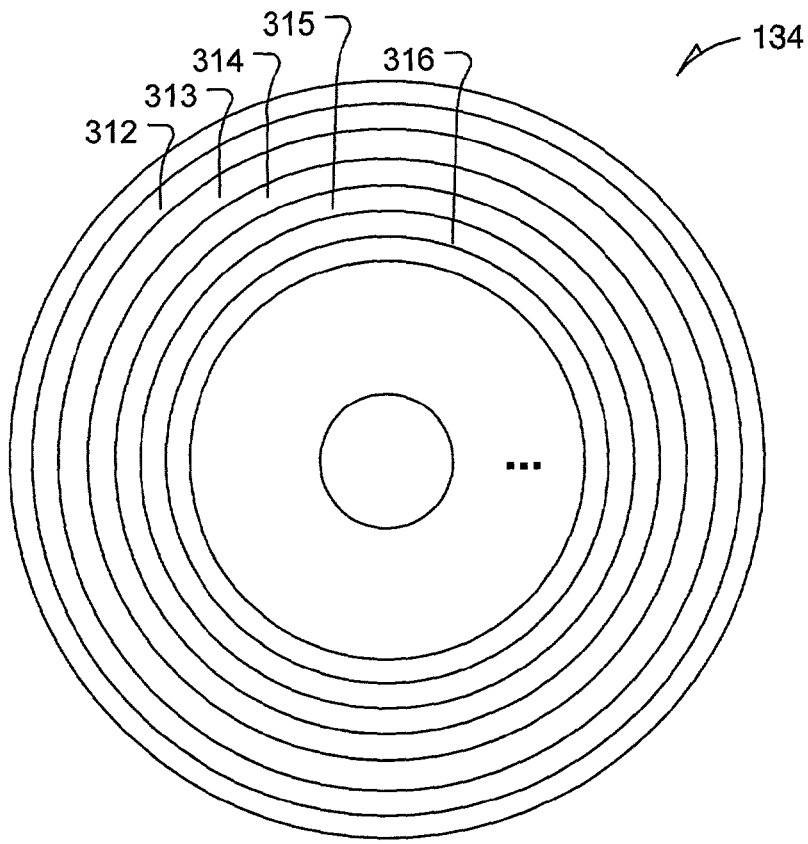
FIG. 3 is a diagram of a disc surface 1341 divided into initial zones.

FIG. 3 is a diagram of a disc surface 1341 divided into initial zones 311–316. A "zone" is a contiguous set of sectors one each of one or more disc surfaces. In the present invention, a disc drive has a plurality of zones. Each one of the "initial zones" 311–316 can be a single track under a single head, or can be a contiguous group of one or more tracks under each of one or more heads (a single track under a plurality of heads is called a "cylinder"). In some embodiments, each zone is a "frequency zone" (as described above, and having one or more tracks) wherein all the data within a single frequency zone is written and read using a single transducing frequency but where different frequency zones use different transducing frequencies. In some embodiments, each frequency zone is also called a "physical zone." In other embodiments, the disc drive is divided into a plurality of physical zones having boundaries that are independent of frequency-zone boundaries. Thus, a physical zone can be, but need not be, equal to a frequency zone. In some embodiments, a zone is a subset of a track contained within a track (e.g., each track can be two zones each having half of the sectors of that track). A zone can also span two or more tracks without being an integer number of tracks. However, making each initial zone equal to one track can make the calculations easier, and is used in the following examples for ease of explanation.

Disc drives incur defects, both during the process of manufacturing and also in the field after manufacturing, that make some sectors unusable. The present invention handles such defects by making spare sectors ("spares") available. The spare sectors are subtracted from the total capacity of the disc drive when defining the nominal capacity of the drive. For example, if about one percent of the sectors will be needed for spares, in order to obtain a disc drive with a nominal capacity of 40 gigabytes (40 GB), the drive would need a total physical capacity of 40.404 GB to provide 0.404 GB of spare sectors plus the 40 GB nominal capacity. In some embodiments, the present invention provides these spare sectors distributed across the disc surface(s). However, the spares are typically not needed in an even distribution, but rather, more spare sectors will be needed where the defect density is the greatest. Thus, the present invention provides a variable number of spare sectors per track (VSPT) to assist in defect management.

The present invention forms logical zones, each logical zone combining one or more of the initial zones. These logical zones form one basis for allocating spare sectors. As an example, a drive can be manufactured with a thousand (1000) physical sectors per track. With one percent (1%) allocated for spares, the drive will have (990) logical sectors per track, and ten (10) spare sectors per track. However, in some drives, some tracks will experience more than ten initial defective sectors, and thus have fewer than (990) logical sectors, and others may have more than (990) available sectors. This variable number of sectors makes the calculation that converts an LBA into a cylinder-head-sector address complicated.

FIG. 4 is a diagram of a disc surface 1341 divided into three logical zones 411, 412, and 413. Logical zone 411 includes initial zones 311, 312, and 313, logical zone 412 includes initial zones 314, and logical zone 413 includes initial zones 315 and 316. In some embodiments, the logical zones 411–413 are formed using as process as described below.

A key element of the variable spares per track (VSPT) defect management scheme of the present invention is the logical zone table (LZT). The LZT sub-divides each physical zone (or combines one or more initial zones) into logical zones (or partitions) that contain tracks affected by a similar defect distribution on the media. In doing so, a constant number of logical sectors per track is achieved for a particular logical zone, in some embodiments. By having the same number of logical sectors on every track within a logical zone, the calculation of a cylinder-head-sector address from an LBA is simplified. As a result, the tedious logical block address (LBA) to physical cylinder/head/sector (PCHS) translation process in full-slip defect management is avoided. In full-slip defect management, the movement of data can span multiple tracks, possibly resulting in differing numbers of logical sectors per track among the involved tracks, and thus the LBA translation that only calculated the initial LBA mapping to the initial sector on each track needs to be supplemented by additional calculations or sector searching once a defective sector and all other sectors between the defect and the spare sector are "slipped" one sector over.

FIG. 5 shows a disc-drive certification process 500. In some embodiments, the LZT generation process 560 is incorporated after the defect detection test stage 550 of the disc-drive certification process 500. Servo information is written to the disc surface(s) at stage 510. The disc surfaces are then pretested with various write and read operations at stage 520. A servo-test stage 530 verifies and/or calibrates the information.

The read write tuning stage 540, calibrates the read-write-chip system with parameters optimized for reads and writes, for example, providing a plurality of frequency zones that each use read or write frequencies. Upon completion of this stage, the defect test stage 550 scans the entire media and maps out defective sectors found into the drive's defect table. The defect table indicates the physical location of defective sectors on each track of the drive.

Stage 560 creates a logical zone table (LZT). Since the LZT is generated after all known defects have been captured, spares sectors can be allocated efficiently since the defect distribution on the drive has already been determined.

LZT Generation Algorithm

For some embodiments, the objectives of the LZT algorithm are as follows:

Allocate spares for each defective sector efficiently.

Minimize spares redundancy (where spares redundancy refers to the provision of more spares than actual defects present).

Partition each physical zone until there are MAX_LOGICALZONES or fewer logical zones per physical zone.

Ensure enough spares are allocated for grown defects, and that such spares are allocated uniformly with respect to the expected need across the disc surface. Spares are allocated where they will be used. Thus, areas in which more defects are initially detected are expected to have more grown defects, and will be allocated more spares, while areas having fewer initially detected defects are expected to incur fewer grown defects, and thus will be allocated fewer spares.

The algorithm comprises two sub-processes:

Logical Zone Partition 560

Spares Allocation 570

Logical Zone Partition Process

The logical zone partition process is an iterative process. Its objective is to minimize the redundancy created when cylinders are partitioned into logical zones. The algorithm can be expressed mathematically as follows:

$$\text{Total no. of defects in } TLZ_k^i = \sum_{n \in TLZ_k^i} D(n)$$

$$\text{Total no. of spares allocated} = \left(\max_{n \in TLZ_k^i} [D(n)]\right) \cdot t_k^i$$

$$\text{Total redundancy on all heads in } TLZ_k^i =$$

$$\sum_{heads} \left\{ \left(\max_{n \in TLZ_k^i} [D(n)]\right) \cdot t_k^i - \sum_{n \in TLZ_k^i} D(n) \right\}$$

For each iteration, the algorithm identifies the minimum redundancy $TLZ_k^i$ which now forms a part of the set of all tentative logical zones for the next iteration. Iteration terminates when the number of tentative zones are less than or equal to MAX_LOGICALZONES.

$$\min_{TLZ_k^i \in Z^i} \left\{ \sum_{heads} \left\{ \left(\max_{n \in TLZ_k^i} [D(n)]\right) \cdot t_k^i - \sum_{n \in TLZ_k^i} D(n) \right\} \right\}$$

D(n): Defect distribution function of drive. e.g. if track 100 has 5 defective sectors, D(100)=5.
$Z^i$: Set of all tentative logical zones in iteration i.
$TLZ_k^i$: k-th tentative logical zone of iteration i
$t_k^i$: Number of tracks in the k-th tentative logical zone of iteration i
n: Track number To illustrate this process, an example is given of a two-head drive with six (6) cylinders and the following defect distribution table as shown in Table 1a below. Each initial zone will have one cylinder. Each track has 1000 sectors and since there are 12 tracks, the total physical capacity of the drive is 12000 sectors. In this example, 1.0% of the physical capacity (120 sectors) is allocated for defects, hence the logical capacity of the drive is 11880 sectors (12 tracks times 990 sectors per track). Also, MAX_LOGICALZONES is set to three (3). Thus, the algorithm will combine the six initial zones into three (or fewer) logical zones. In this drive, all six initial zones will be in a single physical zone, however other embodiments will have a plurality of physical zones, each having up to three logical zones.

TABLE 1a

| | Cylinder | | | | | |
|---|---|---|---|---|---|---|
| Defects/Track | 1 | 2 | 3 | 4 | 5 | 6 |
| Head 0 | 8 | 3 | 4 | 20 | 3 | 6 |
| Head 1 | 2 | 9 | 7 | 2 | 9 | 14 |

Referring again to FIG. 3, but using a single disc platter, in this example cylinder 1 would correspond to initial zone 311 including both the top surface 1341 under a "head 0" and an opposing bottom surface transduced by a "head 1." Similarly, cylinder 2 would correspond to initial zone 312, cylinder 3 would correspond to initial zone 313, cylinder 4 would correspond to initial zone 314, cylinder 5 would correspond to initial zone 315, and cylinder 6 would correspond to initial zone 316.

At stage A, temporary (or tentative) logical zones (TLZs) are assigned such that each cylinder is a separate initial zone. The resulting stage-A TLZ Table (with 6 TLZs) is shown in Table 1b.

TABLE 1b

| | Cylinder | | | | | |
|---|---|---|---|---|---|---|
| Initial TLZ Table | 1 | 2 | 3 | 4 | 5 | 6 |
| Initial Zone # = TLZ | 1 | 2 | 3 | 4 | 5 | 6 |

During stage B, each TLZ is virtually merged with its adjacent TLZ, e.g., TLZ1 and TLZ2, TLZ2 and TLZ3, etc. For each virtual merged zone, the following parameters are computed:

No. of Tracks—>the number of tracks within the merged zone boundary.

Max Defect Per Track—>the maximum number of defects that were found in any one track in the merged temporary zone.

Total Defects—>the total number of defective sectors on a particular head within the merged zone boundary.

Redundancy—>the difference between the total spares allocated and the total number of defects present on a particular head within the merged zone boundary.

$$\text{Redundancy} = (\text{No. of tracks} \times \text{Max Defects Per Track}) - \text{Total Defects} \quad (1)$$

Total Redundancy—>sum total of the redundancies per head.

$$\text{Total redundancy} = \sum_{i}^{head} redundancy_i \quad (2)$$

Table 2 below shows the computed stage B results which indicate that merging TLZ2 and TLZ3 yields the lowest total redundancy. As such, TLZs 2 and 3 are now physically merged to yield TLZ2.

TABLE 2

| Tentative Logical Zone = TLZ' | 1 | 2 | 3 | 4 | 5 | | | | | |
|---|---|---|---|---|---|---|---|---|---|---|
| Merged temporary zone | 1–2 | 2–3 | 3–4 | 4–5 | 5–6 | | | | | |
| Cylinders in MTZ (= initial zones) | 1–2 | 2–3 | 3–4 | 4–5 | 5–6 | | | | | |
| Number of tracks in MTZ = "a" | 2 | 2 | 2 | 2 | 2 | | | | | |
| Head | 0 | 1 | 0 | 1 | 0 | 1 | 0 | 1 | 0 | 1 |
| Maximum defects per track in MTZ = "b" | 8 | 9 | 4 | 9 | 20 | 7 | 20 | 9 | 6 | 14 |
| Total defects in each MTZ = "c" | 11 | 11 | 7 | 16 | 24 | 9 | 23 | 11 | 9 | 23 |
| Redundancy = "d" = (a*b) − c | 5 | 7 | 1 | 2 | 16 | 5 | 17 | 7 | 3 | 5 |
| Total redundancy = d (head 0) + d(head 1) | 12 | | 3 | | 21 | | 24 | | 8 | |
| Choice for merge after this iteration | | | *** | | | | | | | |

The combined initial zones 2 and 3 are thus combined, and the remaining zones are left alone. The remaining TLZs are re-ordered accordingly and the resulting new stage B TLZ Table (with 5 TLZs) is shown in Table 2b.

TABLE 2b

| New temporary zone number | 1' | 2' | 3' | 4' | 5' |
|---|---|---|---|---|---|
| Cylinders | 1 | 2–3 | 4 | 5 | 6 |

Next, at stage C, each TLZ in the new stage B TLZ Table is again virtually merged with its adjacent TLZ. Table 3a below shows the computed stage C results which indicate that merging TLZ4 and TLZ5 yields the lowest total redundancy. As such, TLZs 4 and 5 are merged to yield TLZ4.

TABLE 3a

| Tentative Logical Zone | 1" | | 2" | | 3" | | 4" | |
|---|---|---|---|---|---|---|---|---|
| Merged temporary zone | 1'–2' | | 2'–3' | | 3'–4' | | 4'–5' | |
| Cylinders in MTZ (= initial zones) | 1–3 | | 2–4 | | 4–5 | | 5–6 | |
| Number of tracks in MTZ = "a" | 3 | | 3 | | 2 | | 2 | |
| Head | 0 | 1 | 0 | 1 | 0 | 1 | 0 | 1 |
| Maximum defects per track in MTZ = "b" | 8 | 9 | 20 | 9 | 20 | 9 | 6 | 14 |
| Total defects in each MTZ = "c" | 15 | 18 | 27 | 18 | 23 | 11 | 9 | 23 |
| Redundancy = "d" = (a*b) − c | 9 | 9 | 33 | 9 | 17 | 7 | 3 | 5 |
| Total redundancy = d(head 0) + d(head 1) | 18 | | 42 | | 24 | | 8 | |
| Choice for merge after this iteration | | | | | | | *** | |

The remaining TLZs are again re-ordered accordingly and the resulting new stage C TLZ Table (with 4 TLZs) is shown in Table 3b.

TABLE 3b

| New temporary zone number | 1" | 2" | 3" | 4" |
|---|---|---|---|---|
| Cylinders | 1 | 2–3 | 4 | 5–6 |

Finally, during stage D, the merging process is again repeated. Table 4a below shows the computed stage D results which indicate that merging TLZ1 and TLZ2 yields the lowest total redundancy. As such, TLZs 1 and 2 are merged to yield TLZ1.

TABLE 4a

| Tentative Logical Zone | 1''' | | 2''' | | 3''' | |
|---|---|---|---|---|---|---|
| Merged temporary zone | 1"–2" | | 2"–3" | | 3"–4" | |
| Cylinders in MTZ (= initial zones) | 1–3 | | 2–4 | | 4–6 | |
| Number of tracks in MTZ = "a" | 3 | | 3 | | 3 | |
| Head | 0 | 1 | 0 | 1 | 0 | 1 |
| Maximum defects per track in MTZ = "b" | 8 | 9 | 20 | 9 | 20 | 14 |
| Total defects in each MTZ = "c" | 15 | 18 | 27 | 18 | 29 | 25 |
| Redundancy = "d" = (a*b) − c | 9 | 9 | 33 | 9 | 31 | 17 |
| Total redundancy = d(head 0) + d(head 1) | 18 | | 42 | | 48 | |
| Choice for merge after this iteration | *** | | | | | |

The remaining TLZs are again re-ordered accordingly and the resulting new stage D TLZ Table (with 3 TLZs) is shown in Table 4b.

TABLE 4b

| New temporary zone number = the final logical zone number in this case | 1''' | 2''' | 3''' |
|---|---|---|---|
| | 1 | 2 | 3 |
| Cylinders | 1–3 | 4 | 5–6 |

Referring again to FIG. 4, but using a single disc platter, in this example final logical zone number 1 (temporary zone 1''') would correspond to logical zone 411 including both the top surface 1341 under a "head 0" and an opposing bottom surface transduced by a "head 1." Similarly, final logical zone number 2 would correspond to logical zone 412, and final logical zone number 3 would correspond to logical zone 413.

For this example, since the maximum number of logical zones per physical zone (MAX_LOGICALZONES) is 3, the algorithm terminates with the logical zone cylinder boundaries determined. Table 5 is the interim logical zone table generated, with the assumption that there are 1000 physical sectors per track.

TABLE 5

Interim Logical Zone Table

| The final logical zone number in this case | 1 | | 2 | | 3 | |
|---|---|---|---|---|---|---|
| Starting Cylinder | 1 | | 4 | | 5 | |
| Cylinders in LZ (= initial zones) | 1–3 | | 4 | | 5–6 | |
| Number of tracks in MTZ = "a" | 3 | | 1 | | 2 | |
| Head | 0 | 1 | 0 | 1 | 0 | 1 |
| Maximum defects per track in MTZ = "b" | 8 | 9 | 20 | 2 | 6 | 14 |
| Logical Sectors Per Track = 1000 − b | 992 | 991 | 980 | 998 | 994 | 986 |
| Redundancy per Logical Zone per head | 9 | 9 | 0 | 0 | 3 | 5 |

In other embodiments, there are more than one physical zone, and within each physical zone the above process is performed. The number of iterations will vary according to the value set for MAX_LOGICALZONES, which can differ from three, the value used in this example. Further, some of the plurality of physical zones can have a different number of initial zones, and thus a given number of iterations will result in varying numbers of final logical zones.

Spares Allocation Process

After the logical zone partition process is completed, the spares allocation process is initiated to allocate the remaining spares to the partitioned logical zones for grown defects. Beginning with the logical zone with the least redundancy, the algorithm proceeds to distribute the remaining spares to the logical zones. When the spares are exhausted, or when insufficient number of spares are available for allocation, the algorithm would terminate.

Here is an example based on the interim logical zone table generated earlier. The first stage of the spares allocation phase of the LZT generation algorithm, determines the number of spares for grown defects previously allocated (which also equals the redundancy of that zone) during the logical zone partition process. The resulting allocation matrix is shown in Table 6 below. The allocation matrix shows that LZ2 head 0 and 1 have the least redundancy and LZ1 heads 0 and 1 the most.

TABLE 6

Extra Spares Allocation Matrix

| The final logical zone number in this case | 1 | | 2 | | 3 | |
|---|---|---|---|---|---|---|
| Redundancy per Logical Zone per head | 9 | 9 | 0 | 0 | 3 | 5 |

Next, the number of spares remaining for allocation is calculated as follows:

$$\begin{aligned}\text{Spares for Allocation} &= \text{Total Physical Capacity} - \\ &\quad \text{Logical Capacity} - \text{Factory Defects} - \\ &\quad \text{Spares Allocated By } \textit{LZT} \text{ Generation (3)} \\ &= 6 \text{ cylinders} * 1000 \text{ sectors/track} * \\ &\quad 2 \text{ tracks/cylinder} - 6 * 990 * 2 - 87 - 26 \\ &= 12000 - 11880 - 113 \\ &= 7 \text{ remaining sectors for the final allocation}\end{aligned}$$

TABLE 7

Allocation of Final Spares to Logical Zone Table

| The final logical zone number | 1 | | 2 | | 3 | | Remaining Sectors | Stage |
|---|---|---|---|---|---|---|---|---|
| Head | 0 | 1 | 0 | 1 | 0 | 1 | | |
| Initial | | | | | | | | |
| Logical Sectors Per Track | 992 | 991 | 980 | 998 | 994 | 986 | 7 | I |
| Logical Sectors Per Track | 992 | 991 | 979 | 998 | 994 | 986 | 6 | II |
| Logical Sectors Per Track | 992 | 991 | 979 | 997 | 994 | 986 | 5 | III |
| Logical Sectors Per Track | 992 | 991 | 979 | 997 | 993 | 986 | 3 | IV |
| Logical Sectors Per Track | 992 | 991 | 979 | 997 | 993 | 985 | 1 | V |
| Logical Sectors Per Track | 992 | 991 | 979 | 997 | 993 | 985 | 1 | VI |
| Logical Sectors Per Track | 992 | 991 | 979 | 997 | 993 | 985 | 1 | VII |
| Final | | | | | | | | |
| Logical Sectors Per Track | 992 | 991 | 978 | 997 | 993 | 985 | 0 | VIII |

Table 7 above contains a snapshot of the logical sectors per track of each zone during the different stages of the spares allocation algorithm. At stage I, no spares have been allocated yet, and the logical sectors per track are as per Table 5.

From Table 6, as LZ2/Hd0 has the smallest redundancy, so 1 spare per track is allocated to it. As shown in Table 7 stage II, the logical sectors per track are reduced by one to 979, and the spares remaining is 6. In stage III, LZ2/Hd1 has the next smallest redundancy and it is allocated one spare per track and the logical sectors per track and spares remaining updated. In stage IV, LZ3/Hd0 is allocated next and requires 2 spares as the zone spans across two tracks 5 and 6. In stage V, LZ3/Hd1 is allocated and again requires 2 spares. The number of spares remaining is now one. At stage VI, the algorithm determines that LZ1/Hd0 requires 3 spares but the only one spare remains, so no allocation takes place. Similarly at stage VII, the algorithm again determines that LZ1/Hd1 requires 3 spares so no allocation is done.

Finally, at stage VIII, the algorithm has attempted to allocated spares to all logical zones and thus repeats the process at LZ1/Hd0. Since this zone requires 1 spare and there is one remaining spare, allocation takes place and the zones logical sectors per track is updated as shown. The algorithm is then terminated here as there are no remaining spares left. However, if there were sufficient spares, the algorithm would proceed until no spares are left or no logical zones can be allocated with spares completely.

In this way, the above spare allocation process helps to ensure that there is at least one local spare within each track for grown defects.

Further, the translation from LBA to cylinder-head-sector is simplified, in that all tracks within a logical zone have the same number of logical sectors, thus once the logical zone containing the LBA is found (e.g., by comparing the LBA to the initial and/or final LBA of each zone), the remainder (e.g., by subtracting the LBA from the initial LBA of a logical zone) can be divided by the number of logical sectors per track to find the track/cylinder number and head number.

As an example, Table 8 below provides one example of a resulting Logical Zone table that can be used in translating an LBA into a cylinder-head-sector address using logical zones. In this example, LBAs are mapped to consecutive sectors under one head, then the next head, and so on to the last logical sector of the drive.

TABLE 8

Example of a Logical Zone Table

| Logical zone number | 1 | | 2 | | 3 | |
|---|---|---|---|---|---|---|
| Starting Cylinder | 1 | | 4 | | 5 | |
| Head | 0 | 1 | 0 | 1 | 0 | 1 |
| Final Logical Sectors Per Track | 992 | 991 | 978 | 997 | 993 | 985 |
| Starting LBA | 0 | 2976 = 3*992 | 5949 = 3*992 + 3*991 | 6927 = 3*992 + 3*991 + 1*978 | 7924 = 3*992 + 3*991 + 1*978 + 1*997 | 9910 = 3*992 + 3*991 + 1*978 + 1*997 + 2*993 |

In this example, the last LBA will be LBA sector number 11879. The first logical zone covers LBA=0 to LBA=5948, where head 0 cylinders 1, 2, and 3 include LBA=0 to LBA=2975, and head 1 cylinders 1, 2, and 3 include LBA=2976 to LBA=5948, all of which are in logical zone 1. Thus LBAs 0 to 5948 are mapped to logical zone 1, then to the proper head and cylinder, and a seek moves the transducer 150 to the corresponding position and then sectors are read from that head and cylinder until the correct sector is (or sectors are) found.

Figure 6:
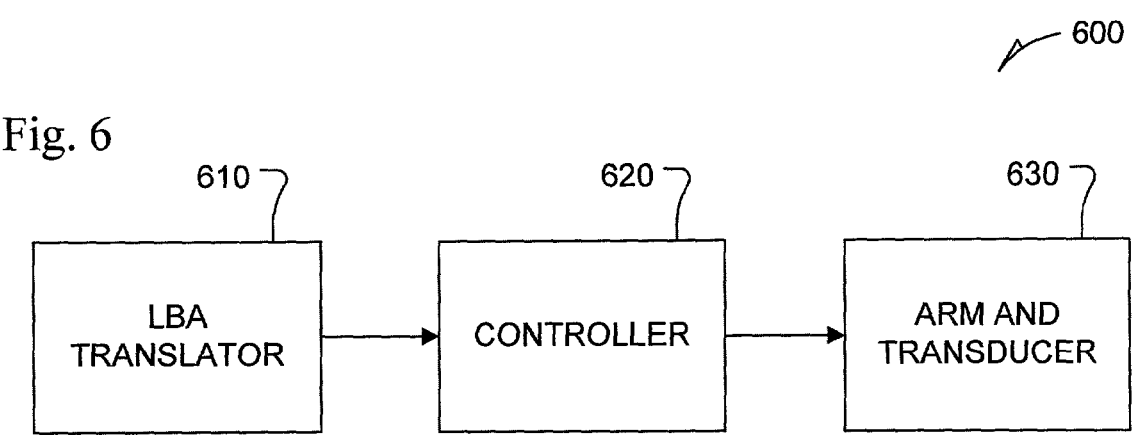
FIG. 6 is a block diagram of an LBA translator 600.

FIG. 6 is a block diagram of an LBA translator 600. Block 610 performs the LBA translation to cylinder-head-sector, controller 620 moves the arm to the position desired, and arm/transducer 630 reads data from the selected track until the desired data sector(s) is found.

[Conclusion]

The Logical Zone Table (LZT) generation process has been described. It consists of two sub-processes; the logical zone partition process and the spares allocation process. Each logical zone in the LZT generated contains tracks affected by a similar defect distribution on the media and has a constant number of logical sectors per track. This allows the tedious logical block address (LBA) to physical cylinder/head/sector (PCHS) translation process in full slip defect management to be avoided completely.

The disc drive 100 of FIG. 1 includes a disc-drive housing 112, 114 and a disc assembly 134 mounted to rotate within the housing. The disc assembly 134 includes at least a first disc surface 1341 having a plurality of zones including a predefined first zone having a plurality of sectors of data and a predefined second zone having a plurality of sectors of data and a predefined third zone having a plurality of sectors of data. The disc drive also includes a first transducer 150/630 positionable facing the first disc surface to transduce data to and from the first zone 314 and the second zone 315 and the third zone 316, an address translator 610 that translates a logical block address to a position address and a controller 620 operable to control positioning of the transducer based on the position address, wherein a first predetermined number of spare sectors are allocated to the first zone, and a second predetermined number of spare sectors are allocated to the second zone and third zone combined.

In some embodiments of the system, all of the plurality of sectors of data in the first zone are recorded at a predetermined first frequency, all of the plurality of sectors of data in the second zone are recorded at a predetermined second frequency that is different than the first frequency, and all of the plurality of sectors of data in the third zone are recorded at a predetermined third frequency that is different than the first frequency and different than the second frequency.

In some embodiments of the system, the second predetermined number of spare sectors is based on a number of defects found in the second zone and third zone combined, and the first predetermined number of spare sectors is based on a number of defects found in the first zone.

In some embodiments of the system, the address translator further comprises a logical zone table, wherein the first zone is located in a first logical zone, and the second zone and third zone are both located in a second logical zone.

In some embodiments of the system, the address translator further comprises a logical zone table, and wherein each logical zone includes one or more zones based on a number of defects found in each zone in order that each logical zone includes a similar number of defects. In some such embodiments, each logical zone is allocated a number of spare sectors based on the number of defects found in all zones of the logical zone. In some embodiments, each logical zone only includes contiguous zones.

In some embodiments, the address translator further comprises a logical zone table formed by iteratively combining a plurality of contiguous zones into logical zones in order to create logical zones each including a similar number of defects.

Some embodiments of the system further include an information-handling system operatively coupled to transmit data to and from the disc drive, an input/output subsystem operatively coupled to input and output data to the information-handling system, and a memory operatively coupled to transmit data to and from the information-handling system.

Another aspect of the present invention provides a method for determining locations of sectors in a disc drive, comprising steps of (a) allocating a plurality of zones for data, (b) determining a defect rate in each of the plurality of zones, and (c) allocating spare sectors based on the determined defect rates.

Some embodiments of the method further include a step of (d) forming logical zones based on the determined defect rates, each logical zone having one or more of the plurality of zones, in order that each logical zone has a similar total number of defects.

In some embodiments of the method, the step (c) of allocating further comprises allocating a number of spare sectors for each logical zone based on the total number of defects in that logical zone.

Some embodiments of the method further include steps of (e) forming a logical zone table, the logical zone table having one or more zones in each logical zone, and (f) translating a logical block address (LBA) into a physical address using the logical zone table.

In some embodiments of the method, all the zones in each logical zone having more than one zone are contiguous zones.

Some embodiments of the method further include steps of (g) forming a logical zone table, the logical zone table initially having two or more contiguous zones in each tentative logical zone, (h) determining which one of the tentative logical zones has the fewest total defects, and combining the zones forming that tentative logical zone having the fewest total defects into a single zone, while leaving the other zones as separate, and (i) iteratively repeating steps (g) and (h).

Some embodiments of the method further include steps of (j) iteratively combining the zones into logical zones in order to obtain logical zones each having a similar number of defects, (k) allocating spare sectors to each logical zone based on a number of defects in each respective logical zone, and (l) translating logical block addresses based on the logical zones.

In some embodiments of the method, each one of the plurality of zones uses a single transducing frequency that is different than the single transducing frequency of the other zones.

Some embodiments of the method further include steps of (m) iteratively combining the zones into logical zones in order to obtain logical zones each having a similar number of defects, (n) allocating an equal number of spare sectors to each logical zone, and (o) translating logical block addresses based on the logical zones.

Yet another aspect of the present invention provides a disc drive system that includes a rotating disc having a plurality of zones of data including a first zone, a second zone, and a third zone, a transducer positionable to transduce data to the first, second, and third zones, and means for allocating spare sectors to the first, second, and third zones and for translating logical block addresses to physical addresses based on the allocation of spare sectors.

CONCLUSION

Described above is a method and apparatus for generating logical zones that each have an effective or optimized number of spare sectors.

In some embodiments, the invention provides a disc-drive system that includes a disc drive. The disc drive includes a disc-drive housing and a disc assembly mounted to rotate within the housing. The disc assembly includes at least a first disc surface having a plurality of zones including a predefined first zone having a plurality of sectors of data and a predefined second zone having a plurality of sectors of data and a predefined third zone having a plurality of sectors of data. The disc drive also includes a first transducer positionable facing the first disc surface to transduce data to and from the first zone and the second zone and the third zone, an address translator that translates a logical block address to a position address and a controller operable to control positioning of the transducer based on the position address, wherein a first predetermined number of spare sectors are allocated to the first zone, and a second predetermined number of spare sectors are allocated to the second zone and third zone combined.

In some embodiments of the system, all of the plurality of sectors of data in the first zone are recorded at a predetermined first frequency, all of the plurality of sectors of data in the second zone are recorded at a predetermined second frequency that is different than the first frequency, and all of the plurality of sectors of data in the third zone are recorded at a predetermined third frequency that is different than the first frequency and different than the second frequency.

In some embodiments of the system, the second predetermined number of spare sectors is based on a number of defects found in the second zone and third zone combined, and the first predetermined number of spare sectors is based on a number of defects found in the first zone.

In some embodiments of the system, the address translator further comprises a logical zone table, wherein the first zone is located in a first logical zone, and the second zone and third zone are both located in a second logical zone.

In some embodiments of the system, the address translator further comprises a logical zone table, and wherein each logical zone includes one or more zones based on a number of defects found in each zone in order that each logical zone includes a similar number of defects. In some such embodiments, each logical zone is allocated a number of spare sectors based on the number of defects found in all zones of the logical zone. In some embodiments, each logical zone only includes contiguous zones.

In some embodiments, the address translator further comprises a logical zone table formed by iteratively combining a plurality of contiguous zones into logical zones in order to create logical zones each including a similar number of defects.

Some embodiments of the system further include an information-handling system operatively coupled to transmit data to and from the disc drive, an input/output subsystem operatively coupled to input and output data to the information-handling system, and a memory operatively coupled to transmit data to and from the information-handling system.

Another aspect of the present invention provides a method for determining locations of sectors in a disc drive, comprising steps of (a) allocating a plurality of zones for data, (b) determining a defect rate in each of the plurality of zones, and (c) allocating spare sectors based on the determined defect rates.

Some embodiments of the method further include a step of (d) forming logical zones based on the determined defect rates, each logical zone having one or more of the plurality of zones, in order that each logical zone has a similar total number of defects.

In some embodiments of the method, the step (c) of allocating further comprises allocating a number of spare sectors for each logical zone based on the total number of defects in that logical zone.

Some embodiments of the method further include steps of (e) forming a logical zone table, the logical zone table having one or more zones in each logical zone, and (f) translating a logical block address (LBA) into a physical address using the logical zone table.

In some embodiments of the method, all the zones in each logical zone having more than one zone are contiguous zones.

Some embodiments of the method further include steps of (g) forming a logical zone table, the logical zone table initially having two or more contiguous zones in each tentative logical zone, (h) determining which one of the tentative logical zones has the fewest total defects, and combining the zones forming that tentative logical zone having the fewest total defects into a single zone, while leaving the other zones as separate, and (i) iteratively repeating steps (g) and (h).

Some embodiments of the method further include steps of (j) iteratively combining the zones into logical zones in order to obtain logical zones each having a similar number of defects, (k) allocating spare sectors to each logical zone based on a number of defects in each respective logical zone, and (l) translating logical block addresses based on the logical zones.

In some embodiments of the method, each one of the plurality of zones uses a single transducing frequency that is different than the single transducing frequency of the other zones.

Some embodiments of the method further include steps of (m) iteratively combining the zones into logical zones in order to obtain logical zones each having a similar number of defects, (n) allocating an equal number of spare sectors to each logical zone, and (o) translating logical block addresses based on the logical zones.

Yet another aspect of the present invention provides a disc drive system that includes a rotating disc having a plurality of zones of data including a first zone, a second zone, and a third zone, a transducer positionable to transduce data to the first, second, and third zones, and means for allocating spare sectors to the first, second, and third zones and for translating logical block addresses to physical addresses based on the allocation of spare sectors.

It is to be understood that the above description is intended to be illustrative, and not restrictive. Although numerous characteristics and advantages of various embodiments of the present invention have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled.

What is claimed is:

1. A data storage system comprising:
    a first data storage medium having a plurality of zones including a predefined first zone having a plurality of sectors of data and a predefined second zone having a plurality of sectors of data and a predefined third zone having a plurality of sectors of data; and
    a controller operable to retrieve and store data on the first data storage medium, wherein a first predetermined number of spare sectors are allocated to the first zone, and a second predetermined number of spare sectors are allocated to the second zone and third zone combined;
    wherein the second predetermined number of spare sectors is based on a number of defects found in the second zone and third zone combined, and the first predetermined number of spare sectors is based on a number of defects found in the first zone.

2. The system according to claim 1, wherein all of the plurality of sectors of data in the first zone are recorded at a predetermined first frequency, all of the plurality of sectors of data in the second zone are recorded at a predetermined second frequency that is different than the first frequency, and all of the plurality of sectors of data in the third zone are recorded at a predetermined third frequency that is different than the first frequency and different than the second frequency.

3. The system according to claim 1, further comprising an address translator operably coupled to the controller, the address translator comprising a logical zone table, wherein the first zone is located in a first logical zone, and the second zone and third zone are both located in a second logical zone.

4. The system according to claim 1, further comprising an address translator operably coupled to the controller, the address translator comprising a logical zone table, and wherein each logical zone includes one or more zones based on a number of defects found in each zone in order that each logical zone includes a similar number of defects.

5. The system according to claim 4, wherein each logical zone is allocated a number of spare sectors based on the total number of defects found in all of the zones of the logical zone.

6. The system according to claim 4, wherein each logical zone only includes one or more contiguous zones.

7. The system according to claim 1, further comprising an address translator operably coupled to the controller, the address translator comprising a logical zone table formed by iteratively combining a plurality of contiguous zones into logical zones in order to create logical zones each including a similar number of defects.

8. The system according to claim 1, further comprising:
    an information-handling system operatively coupled to transmit data to and from the data storage device;
    an input/output subsystem operatively coupled to input and output data to the information-handling system; and
    a memory operatively coupled to transmit data to and from the information-handling system.

9. A method for determining locations of sectors in a data storage device, comprising steps of:
    assigning a plurality of zones for data;
    determining a defect rate in each of the plurality of zones;
    allocating spare sectors based on the determined defect rates;
    forming logical zones based on the determined defect rates, each logical zone having one or more of the plurality of zones, in order that each logical zone has a similar total number of defects.

10. The method according to claim 9, wherein the allocating further comprises allocating a number of spare sectors for each logical zone based on the total number of defects in that logical zone.

11. The method according to claim 10, further comprising steps of:
    forming a logical zone table, the logical zone table having one or more zones in each logical zone; and
    translating a logical block address (LBA) into a physical address using the logical zone table.

12. The method according to claim 9, wherein all the zones in each logical zone having more than one zone are contiguous zones.

13. The method according to claim 9, further comprising steps of:
    forming a logical zone table, the logical zone table initially having two or more contiguous zones in each tentative logical zone;
    determining which one of the tentative logical zones has the fewest total defects, and combining the zones forming that tentative logical zone having the fewest total defects into a single zone, while leaving the other zones as separate.

14. The method according to claim 9, further comprising steps of:
    iteratively combining the zones into logical zones in order to obtain logical zones each having a similar number of defects;
    allocating spare sectors to each logical zone based on a number of defects in each respective logical zone; and
    translating logical block addresses based on the logical zones.

15. The method according to claim 14, wherein all the zones in each logical zone having more than one zone are contiguous zones.

16. The method according to claim 9, wherein each one of the plurality of zones uses a single transducing frequency that is different than the single transducing frequency of the other zones.

17. The method according to claim 9, further comprising steps of:
    iteratively combining the zones into logical zones in order to obtain logical zones each having a similar number of defects;
    allocating an equal number of spare sectors to each logical zone; and
    translating logical block addresses based on the logical zones.

* * * * *